(12) United States Patent
Zhang et al.

(10) Patent No.: US 10,116,364 B2
(45) Date of Patent: *Oct. 30, 2018

(54) METHOD FOR DETERMINING RANK INDICATION RI BIT NUMBER, BASE STATION, AND TERMINAL

(71) Applicant: Huawei Technologies Co., Ltd., Shenzhen, Guangdong (CN)

(72) Inventors: Hongping Zhang, Shanghai (CN); Dong Lei, Shanghai (CN); Yi Guo, Shanghai (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,522

(22) Filed: Jul. 12, 2016

(65) Prior Publication Data

US 2016/0323020 A1 Nov. 3, 2016

Related U.S. Application Data

(63) Continuation of application No. 14/799,296, filed on Jul. 14, 2015, now Pat. No. 9,419,693, which is a
(Continued)

(51) Int. Cl.
*H04B 7/04* (2017.01)
*H04B 7/0456* (2017.01)
(Continued)

(52) U.S. Cl.
CPC .......... *H04B 7/046* (2013.01); *H04B 7/0417* (2013.01); *H04B 7/0486* (2013.01); *H04B 7/063* (2013.01);
(Continued)

(58) Field of Classification Search
CPC .... H04B 7/063; H04B 7/0645; H04B 7/0417; H04B 7/0486; H04B 7/0632; H04B 7/046;
(Continued)

(56) References Cited

U.S. PATENT DOCUMENTS 8,045,508 B2   10/2011   Lee et al.
9,226,136 B2 * 12/2015   Kim ................. H04W 72/0453
(Continued)

FOREIGN PATENT DOCUMENTS

CN   102792726 A   11/2012
CN   102835051 A   12/2012
(Continued)

OTHER PUBLICATIONS

"3rd Generation Partnership Project; Technical Specification Group Radio Access Network; Evolved Universal Terrestrial Radio Access (E-UTRA); Multiplexing and channel coding (Reiease 11)", 3GPP TS 36.212 V11.1.0, Dec. 2012, 82 pages.
(Continued)

*Primary Examiner* — Syed Haider

(57) ABSTRACT

The present invention provides a method for determining a rank indication (RI) bit number, a base station, and a terminal. The method includes: determining, by a base station, indication information according to a correspondence between a terminal and the base station and a multi-input multi-output (MIMO) capability of the terminal, where the indication information includes information used by the terminal for determining a bit number occupied for sending a RI; and sending, by the base station, the indication information to the terminal, so that the terminal determines, according to the indication information, the bit number
(Continued)

occupied for sending the RI. In the present invention, the UE and the base station agree or understanding of the bit number occupied by RI information.

7 Claims, 8 Drawing Sheets

Related U.S. Application Data continuation of application No. PCT/CN2013/070713, filed on Jan. 18, 2013.

(51) Int. Cl.
*H04B 7/0417* (2017.01)
*H04L 12/24* (2006.01)
*H04B 7/06* (2006.01)
*H04W 72/04* (2009.01)
*H04W 88/02* (2009.01)
*H04W 88/08* (2009.01)
*H04W 84/04* (2009.01)

(52) U.S. Cl.
CPC ........... *H04B 7/0645* (2013.01); *H04L 41/12* (2013.01); *H04W 72/042* (2013.01); *H04B 7/0632* (2013.01); *H04W 84/042* (2013.01); *H04W 88/02* (2013.01); *H04W 88/08* (2013.01)

(58) Field of Classification Search
CPC ..... H04W 24/10; H04W 88/02; H04W 88/08; H04W 72/042; H04W 84/042; H04W 84/42; H04L 41/12
See application file for complete search history.

(56) References Cited

U.S. PATENT DOCUMENTS

| | | |
|---|---|---|
| 2008/0317145 A1 | 12/2008 | Clerckx |
| 2009/0262695 A1 | 10/2009 | Chen |
| 2010/0315969 A1* | 12/2010 | Jongren ............... H04B 7/0417 370/252 |
| 2011/0243012 A1 | 10/2011 | Luo |
| 2011/0280222 A1 | 11/2011 | Nam |
| 2012/0087254 A1 | 4/2012 | Yin et al. |
| 2012/0307648 A1 | 12/2012 | Okubo et al. |
| 2013/0095816 A1* | 4/2013 | Gerstenberger .. H04W 72/0406 455/422.1 |
| 2013/0114513 A1 | 5/2013 | Taoka et al. |
| 2013/0250895 A1 | 9/2013 | Prasad et al. |
| 2013/0322361 A1 | 12/2013 | Ko |
| 2014/0146697 A1 | 5/2014 | Kim et al. |
| 2015/0009928 A1 | 1/2015 | Sohn |
| 2015/0085770 A1* | 3/2015 | Nagata ................. H04W 24/10 370/329 |

FOREIGN PATENT DOCUMENTS

| | | |
|---|---|---|
| EP | 2523498 A1 | 11/2012 |
| JP | 2011142570 A | 7/2011 |
| JP | 2016502816 A | 1/2016 |
| WO | 2010/124244 A2 | 10/2010 |
| WO | 2012141634 A1 | 10/2012 |

OTHER PUBLICATIONS

"3rd Generation Partnership Project; Technical Specification Group Radio Access Network; Evolved Universal Terrestrial Radio Access (E-UTRA); User Equipment (UE) radio access capabilities (Release 11)", 3GPP TS 36.306 V11.2.0, Dec. 2012, 26 pages.
"3rd Generation Partnership Project; Technical Specification Group Radio Access Network; Evolved Universal Terrestrial Radio Access (E-UTRA); Physical layer procedures (Reiease 11)", 3GPP TS 36.213 V11.1.0, Dec. 2012, 160 pages.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.
"Discussion on UE MIMO capability for CA", Mediatek Inc., 3GPP TSG RAN WG4 Meeting 3GPPRAN4#57, Nov. 15-19, 2010, 2 pages, R4-104299.
"Discussion and TP for Missing L1 parameters (CQI repozting related)", Texas Instruments, 3GPP TSG RAN WG2 63bis, Sep. 29-Oct. 3, 2008, 5 pages, R2-085605.

* cited by examiner

METHOD FOR DETERMINING RANK INDICATION RI BIT NUMBER, BASE STATION, AND TERMINAL

CROSS-REFERENCE TO RELATED APPLICATIONS

This application, is a continuation of U.S. patent application Ser. No. 14/799,256, filed on Jul. 14, 2015, which is a continuation of International Application No. PCT/CN2013/070713, filed on Jan. 18, 2013. The afore-mentioned patent applications are hereby incorporated by reference in their entireties.

TECHNICAL FIELD

The present invention relates to communications technologies, and in particular, to a method for determining a rank indication RI bit number, a base station, and a terminal.

BACKGROUND

With the development of a mobile communication system, a long term evolution network (LTE for short) has become a mobile communication network studied by various manufacturers in the 3rd Generation Partnership Project (3GPP for short) organization actively. An objective of the LTE is to provide a low-cost network that can reduce a time delay, increase a user data rate, and increase system capacity and coverage. With the growth of data services, a multi-input multi-output (multi-input multi-output, MIMO for short) technology, as a new technology, is introduced into an LTE system. The application of the MIMO technology makes space become a resource that can be used to improve performance. Two communication parties using the MIMO technology can use multiple antennas at a transmitting end to send signals independently, and receive and restore original information at a receiving end by using multiple antennas at the same time, so that radio channel capacity is increased exponentially. On condition that bandwidth is not increased, spectrum utilization can be increased exponentially. In the MIMO technology, according to channel quality indicator (channel quality indicator, CQI for short) report configuration information sent by a base station, a user equipment (user equipment, UE) needs to report parameters indicated by the configuration information to the base station, for example, a CQI of a radio channel, and a rank indication (RI for short). The base station performs adaptive modulation and coding based on the CQI and the RI that are reported by the UE, so as to adapt to a radio condition. The RI is the number of MIMO layers suggested by the UE according to the radio condition (informally, the number of data channels suggested to foe used for data transmission).

However, how a base station and a UE perform adaptive modulation and coding/decoding based on a correct RI separately to use a MIMO function normally is a problem to be solved in the industry.

SUMMARY

The present invention provides a method for determining a rank indication RI bit number, a base station, and a terminal, so that a MIMO function can be normally used between a base station and a UE based on a correct RI.

In a first aspect, a method for determining a rank indication RI bit number is provided, where the method includes: determining, by a base station, indication information according to a correspondence between a terminal and the base station and a multi-input multi-output MIMO capability of the terminal, where the indication information includes information used by the terminal for determining a bit number occupied for sending a RI; and sending, by the base station, the indication information to the terminal, so that the terminal determines, according to the indication information, the bit number occupied for sending the RI.

With reference to the first aspect, in a first possible implementation manner, the determining, by a base station, indication information according to a correspondence between a terminal and the base station and a multi-input multi-output MIMO capability of the terminal includes: when the terminal matches the base station, determining the indication information based on a multi-input multi-output MIMO capability indicated by a terminal category of the terminal or a MIMO capability indicated by a band combination of the terminal; or when the terminal does not match the base station, determining the indication information based on a MIMO capability indicated by a terminal category of the terminal.

With reference to the first possible implementation manner of the first aspect, in a second possible implementation manner, the indication information includes channel quality indicator CQI report configuration information. The sending, by the base station, the indication information to the terminal includes: when the indication information is determined based on the MIMO capability indicated by the band combination of the terminal, sending first CQI report configuration information to the terminal, so that the terminal determines the bit number according to the first CQI report configuration information; or when the indication information is determined based on the MIMO capability indicated by the terminal category of the terminal, sending second CQI report configuration information to the terminal, so that the terminal determines the bit number according to the second CQI report configuration information.

With reference to the first possible implementation manner of the first aspect, in a third possible implementation manner, the indication information includes CQI report configuration information. The sending, by the base station, the indication information to the terminal includes: when the indication information is determined based on the MIMO capability indicated by the band combination of the terminal, carrying first information in the CQI report configuration information, where the first information is used to instruct the terminal to determine the bit number based on the MIMO capability indicated by the band combination of the terminal; or when the indication information is determined based on the MIMO capability indicated by the terminal category of the terminal, instructing, by using the CQI report configuration information, the terminal to determine the bit number based on the MIMO capability indicated by the terminal category of the terminal; or when the indication information is determined based on the MIMO capability indicated by the terminal category of the terminal, carrying second information in the CQI report configuration information, where the second information is used to instruct the terminal to determine the bit number according to the MIMO capability indicated by the terminal category.

With reference to the first possible implementation manner of the first aspect, in a fourth possible implementation manner, the indication information includes carrier aggregation CA indication information. The sending, by the base station, the indication information to the terminal includes:

sending the CA indication information to the terminal, where the CA indication information is used to instruct the terminal to determine the bit number according to the MIMO capability indicated by the band combination of the terminal.

With reference to the first aspect, or any one of the first possible implementation manner to the fourth possible implementation manner of the first aspect, in a fifth possible implementation manner, the method further includes: before the indication information is sent to the terminal, determining the bit number based on the MIMO capability indicated by the terminal category of the terminal; or after the indication information is sent to the terminal, determining the bit number based on the correspondence between the terminal and the base station.

With reference to the first aspect or the first possible implementation manner of the first aspect, in a sixth possible implementation manner, the indication information includes the bit number that is occupied by the RI sent by the terminal.

With reference to the sixth possible implementation manner of the first aspect, in a seventh possible implementation manner, the method further includes: when the bit number is determined based on the MIMO capability indicated by the band combination of the terminal, if a band combination currently used by the terminal includes a band that appears at least two times, determining, based on a maximum value of the maximum number of supported MIMO layers that is indicated by the band, the bit number corresponding to the band.

In a second aspect, a method for determining a RI bit number is provided, where the method includes:

receiving, by a terminal, indication information sent by a base station, where the indication information includes information used by the terminal for determining a bit number occupied for sending a RI; and determining, by the terminal according to the indication information, the bit number occupied, by the RI.

With reference to the second aspect, in a first possible implementation manner, the determining, by the terminal according to the indication information, the bit number occupied by the RI includes: selecting, according to the indication information, to determine the bit number based on a MIMO capability indicated by a terminal category or a MIMO capability indicated by a band combination.

With reference to the first possible implementation manner of the second aspect, in a second possible implementation manner, the indication information includes channel quality indicator CQI report configuration information. The determining, by the terminal according to the indication information, the bit number occupied by the RI includes: if first CQI report configuration information sent by the base station is received, determining the bit number based on the MIMO capability indicated by the band combination; or if second CQI report configuration information sent by the base station is received, determining the bit number based on the MIMO capability indicated by the terminal category.

With reference to the first possible implementation manner of the second aspect, in a third possible implementation manner, the indication information includes CQI report configuration information. The determining, by the terminal according to the indication information, the bit number occupied by the RI includes: if the received CQI report configuration information sent by the base station carries first information, where the first information is used to instruct the terminal to determine the bit number based on the MIMO capability indicated by the band combination of the terminal, determining the bit number based on the MIMO capability indicated by the band combination; or if the received CQI report configuration information sent by the base station does not carry the first information, determining the bit number based on the MIMO capability indicated by the terminal category; or if the received CQI report configuration information sent by the base station carries second information, where the second information is used to instruct the terminal to determine the bit number according to the MIMO capability indicated by the terminal category, determining the bit number based on the MIMO capability indicated by the terminal category.

With reference to the first possible implementation manner of the second aspect, in a fourth possible implementation manner, the indication information includes carrier aggregation CA indication information. The determining, by the terminal according to the indication information, the bit number occupied by the RI includes: if the CA indication information sent by the base station is received, determining the bit number based on the MIMO capability indicated by the band combination.

With reference to any one of the first possible implementation manner to the fourth possible implementation manner of the second aspect, in a fifth possible implementation manner, the determining, by the terminal according to the indication information, the bit number occupied by the RI includes: when the bit number is determined based on the MIMO capability indicated by the band combination of the terminal, if a currently used band combination includes a band that appears at least two times, determining, based on a maximum value of the maximum number of supported MIMO layers that is indicated by the band, the bit number corresponding to the band.

With reference to any one of the first possible implementation manner to the fifth possible implementation manner of the second aspect, in a sixth possible implementation manner, the method farther includes: before receiving the indication information sent by the base station, determining the bit number based on the MIMO capability indicated by the terminal category.

With reference to the second aspect, in a seventh possible implementation manner, the receiving, by a terminal, indication information sent by a base station includes: receiving, by the terminal, the bit number occupied by the RI and sent by the base station.

In a third aspect, a base station is provided, where the base station includes:

an indication information determining unit, configured to determine indication information according to a correspondence between a terminal and the base station and a multi-input multi-output MIMO capability of the terminal, where the indication information includes information used by the terminal for determining a bit number occupied for sending a RI; and an indication information sending unit, configured to send the indication information to the terminal, so that the terminal determines, according to the indication information, the bit number occupied for sending the rank indication RI.

With reference to the third aspect, in a first possible implementation manner, the indication information determining unit is specifically configured to: when the terminal matches the base station, determine the indication information based on a multi-input multi-output MIMO capability indicated by a terminal category of the terminal or a MIMO capability indicated by a band combination of the terminal; or when the terminal does not match the base station, determine the indication information based on a MIMO capability indicated by a terminal category of the terminal.

With reference to the first possible implementation manner of the third aspect, in a second possible implementation manner, the indication information includes CQI report configuration information. The indication information determining unit includes: a first determining subunit, configured to: when the indication information is determined based on the MIMO capability indicated by the band combination of the terminal, determine first CQI report configuration information as the indication information; and a second determining subunit, configured to: when the indication information is determined based on the MIMO capability indicated by the terminal category of the terminal, determine second CQI report configuration information as the indication information.

With reference to the first possible implementation manner of the third aspect, in a third possible implementation manner, the indication information includes CQI report configuration information. The indication information determining unit includes: a third determining subunit, configured to: when the indication information is determined based on the MIMO capability indicated by the band combination of the terminal, determine to carry first information in the CQI report configuration information, where the first information is used to instruct the terminal to determine the bit number based on the MIMO capability indicated by the band combination of the terminal; or when the indication information is determined based on the MIMO capability indicated by the terminal category of the terminal, instruct, by using the CQI report configuration information, the terminal to determine the bit number based on the MIMO capability indicated by the terminal category of the terminal; or when the indication information is determined based on the MIMO capability indicated by the terminal category of the terminal, carry second information in the CQI report configuration information, where the second information is used to instruct the terminal to determine the bit number according to the MIMO capability indicated by the terminal category.

With reference to the third aspect, in a fourth possible implementation manner, the indication information includes carrier aggregation CA indication information. The indication information determining unit is specifically configured to determine the CA indication information as the indication information, where the CA indication information is used to instruct the terminal to determine the bit number according to the MIMO capability indicated by the band combination of the terminal.

With reference to the third aspect, or any one of the first possible implementation manner to the fourth possible implementation manner of the third aspect, in a fifth possible implementation manner, the base station further includes: a RI bit determining unit, configured to: before the indication information is sent to the terminal, determine the bit number based on the MIMO capability indicated by the terminal category of the terminal; or after the indication information is sent to the terminal, determine the bit number based on the correspondence between the terminal and the base station.

With reference to the third aspect, in a sixth possible implementation manner, the indication information determining unit is specifically configured to determine the bit number that is occupied by the RI sent by the terminal, as the indication information.

With reference to the first possible implementation manner of the third aspect, in a seventh possible implementation manner, the indication information determining unit is specifically configured to: when the bit number is determined based on the MIMO capability indicated by the band combination of the terminal, if a band combination currently used by the terminal includes a band that appears at least two times, determine, based on a maximum value of the maximum number of supported MIMO layers that is indicated by the band, the bit number corresponding to the band.

In a fourth aspect, a terminal is provided, where the terminal includes:
an indication information receiving unit, configured to receive indication information sent by a base station, where the indication information includes information used by the terminal for determining a bit number occupied for sending a RI; and
a rank indication RI bit determining unit, configured to determine, according to the indication information, the bit number occupied by the RI.

With reference to the fourth aspect, in a first possible implementation manner, the RI bit determining unit is specifically configured to select, according to the indication information received by the indication information receiving unit, to determine the bit number according to a multi-input multi-output MIMO capability indicated by a terminal category or a MIMO capability indicated by a band combination.

With reference to the first possible implementation manner of the fourth aspect, in a second possible implementation manner, the indication information includes channel quality indicator CQI report configuration information. The RI bit determining unit includes: a first determining subunit, configured to: when the indication information receiving unit receives first CQI report configuration information sent by the base station, determine the bit number based on the MIMO capability indicated by the band combination; and a second determining subunit, configured to: when the indication information receiving unit receives second CQI report configuration information sent by the base station, determine the bit number based on the MIMO capability indicated by the terminal category.

With reference to the first possible implementation manner of the fourth aspect, in a third possible implementation manner, the indication information includes CQI report configuration information. The RI bit determining unit includes: a third determining subunit, configured to: if the CQI report configuration information sent by the base station and received by the indication information receiving unit carries first information, where the first information is used to instruct the terminal to determine the bit number based on the MIMO capability indicated by the band combination of the terminal, determine the bit number based on the MIMO capability indicated by the band combination of the terminal; or if the received CQI report configuration information sent by the base station does not carry the first information, determine the bit number based on the MIMO capability indicated by the terminal category; or if the received CQI report configuration information sent by the base station carries second information, where the second information is used to instruct the terminal to determine the bit number according to the MIMO capability indicated by the terminal category, determine the bit number based on the MIMO capability indicated by the terminal category.

With reference to the fourth aspect, in a fourth possible implementation manner, the RI bit determining unit is specifically configured to: when the indication information receiving unit receives the CA indication information sent by the base station, determine the bit number based on the MIMO capability indicated by the band combination.

With reference to any one of the first possible implementation manner to the fourth possible implementation manner of the fourth aspect, in a fifth possible implementation manner, the RI bit determining unit is further configured to: when the bit number is determined based on the MIMO capability indicated by the band combination of the terminal, if a currently used band combination includes a band that appears at least two times, determine, based on a maximum value of the maximum number of supported MIMO layers that is indicated by the band, the bit number corresponding to the band.

With reference to the fourth aspect, or any one of the first possible implementation manner to the fifth possible implementation manner of the fourth aspect, in a sixth possible implementation manner, the RI bit determining unit is further configured to: before the indication information receiving unit receives the indication information sent by the base station, determine the bit number based on the MIMO capability indicated by the terminal category.

With reference to the fourth aspect, in a seventh possible implementation manner, the indication information receiving unit is specifically configured to receive the bit number occupied by the RI and sent by the base station; and the RI bit determining unit is specifically configured to use the bit number received by the indication information receiving unit as the bit number occupied by the RI.

In a fifth aspect, a base station is provided, where the base station includes:

a processor, configured to determine indication information according to a correspondence between a terminal and the base station and a multi-input multi-output MIMO capability of the terminal, where the indication information includes information used by the terminal for determining a bit number occupied for sending a rank indication RI; and a transmitter, configured to send the indication information to the terminal, so that the terminal determines, according to the indication information, the bit number occupied for sending the RI.

With reference to the fifth aspect, in a first possible implementation manner, the processor is specifically configured to: when the terminal matches the base station, determine the indication information based on a multi-input multi-output MIMO capability indicated by a terminal category of the terminal or a MIMO capability indicated by a band combination of the terminal; or when the terminal does not match the base station, determine the indication information based on a MIMO capability indicated by a terminal category of the terminal.

With reference to the first possible implementation manner of the fifth aspect, in a second possible implementation manner, the indication information includes channel quality indicator CQI report configuration information. The processor is specifically configured to: when the indication information is determined based on the MIMO capability indicated by the band combination of the terminal, determine first CQI report configuration information as the indication information; and when the indication information is determined based on the MIMO capability indicated by the terminal category of the terminal, determine second CQI report configuration information as the indication information.

With reference to the first possible implementation manner of the fifth aspect, in a third possible implementation manner, the indication information includes CQI report configuration information. The processor is specifically configured to: when the indication information is determined based on the MIMO capability indicated by the band combination of the terminal, determine to carry first information in the CQI report configuration information, where the first information is used to instruct the terminal to determine the bit number based on the MIMO capability indicated by the band combination of the terminal; or when the indication information is determined based on the MIMO capability indicated by the terminal category of the terminal, determine not to carry the first information in the CQI report configuration information, so as to instruct the terminal to determine the bit number based on the MIMO capability indicated by the terminal category of the terminal; or when the indication information is determined based on the MIMO capability indicated by the terminal category of the terminal, carry second information in the CQI report configuration information, where the second information is used to instruct the terminal to determine the bit number according to the MIMO capability indicated by the terminal category.

With reference to the first possible implementation manner of the fifth aspect, in a fourth possible implementation manner, the indication information includes carrier aggregation CA indication information. The processor is specifically configured to determine the CA indication information as the indication information, where the CA indication information is used to instruct the terminal to determine the bit number according to the MIMO capability indicated by the band combination of the terminal.

With reference to the fifth aspect, or any one of the first possible implementation manner to the fourth possible implementation manner of the fifth aspect, in a fifth possible implementation manner, the processor is further configured to: before the indication information is sent to the terminal, determine the bit number based on the MIMO capability indicated by the terminal category of the terminal; or after the indication information is sent to the terminal, determine the bit number based on the correspondence between the terminal and the base station.

With reference to the fifth aspect, in a sixth possible implementation manner, the processor is specifically configured to determine the bit number that is occupied by the RI sent by the terminal, as the indication information.

With reference to the sixth possible implementation manner of the fifth aspect, in a seventh possible implementation manner, the processor is further configured to: when the bit number is determined based on the MIMO capability indicated by the band combination of the terminal, if a band combination currently used by the terminal includes a band that appears at least two times, determine, based on a maximum value of the maximum number of supported MIMO layers that is indicated by the band, the bit number corresponding to the band.

In a sixth aspect, a terminal is provided, where the terminal includes:

a receiver, configured to receive indication information sent by a base station, where the indication information includes information used by the terminal for determining a bit number occupied for sending a rank indication RI; and a processor, configured to determine, according to the indication information, the bit number occupied by the RI.

With reference to the sixth aspect, in a first possible implementation manner, the processor is specifically configured to select, according to the indication information received by the receiver, to determine the bit number based on a multi-input multi-output MIMO capability indicated by a terminal category or a MIMO capability indicated by a band combination.

With reference to the sixth aspect or the first possible implementation manner of the sixth aspect, in a second possible implementation manner, the indication information includes CQI report configuration information. The processor is specifically configured to: when the receiver receives first CQI report configuration information sent by the base station, determine the bit number based on the MIMO capability indicated by the band combination; and when the receiver receives second CQI report configuration information sent by the base station, determine the bit number based on the MIMO capability indicated by the terminal category.

With reference to the first possible implementation manner of the sixth aspect, in a third possible implementation manner, the indication information includes CQI report configuration information. The processor is specifically configured to: when the CQI report configuration information sent by the base station and received by the receiver carries first information, where the first information is used to instruct the terminal to determine the bit number based on the MIMO capability indicated by the band combination of the terminal, determine the bit number based on the MIMO capability indicated by the band combination of the terminal; or when the CQI report configuration information sent by the base station and received by the receiver does not carry the first information, determine the bit number based on the MIMO capability indicated by the terminal category; or when the received CQI report configuration information sent by the bass station carries second information, where the second information is used to instruct the terminal to determine the bit number according to the MIMO capability indicated by the terminal category, determine the bit number based on the MIMO capability indicated by the terminal category.

With reference to the first possible implementation manner of the sixth aspect, in a fourth possible implementation manner, the processor is specifically configured to: when the receiver receives CA indication information sent by the base station, determine the bit number based on the MIMO capability indicated by the band combination.

With reference to any one of the first possible implementation manner to the fourth possible implementation manner of the sixth aspect, in a fifth, possible implementation manner, the processor is further configured to: when the bit number is determined based on the MIMO capability indicated by the band combination of the terminal, if a currently used band combination includes a band that appears at least two times, determine, based on a maximum value of the maximum number of supported MIMO layers that is indicated by the band, the bit number corresponding to the band.

With reference to the sixth aspect, or any one of the first possible implementation manner to the fifth possible implementation manner of the sixth aspect, in a sixth possible implementation manner, the processor is further configured to: before the receiver receives the indication information sent by the base station, determine the bit number based on the MIMO capability indicated by the terminal category.

With reference to the sixth aspect, in a seventh possible implementation manner, the receiver is specifically configured to receive the bit number occupied by the RI and sent by the base station; and the processor is specifically configured to use the bit number received by the receiver as the bit number occupied by the RI.

Technical effects of the method for determining a rank indication RI bit number, the base station, and the terminal that are provided by the present invention are: The base station sends indication information to the terminal, so that the terminal determines, according to the indication information, the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

DETAILED DESCRIPTION

Figures 1, 2:
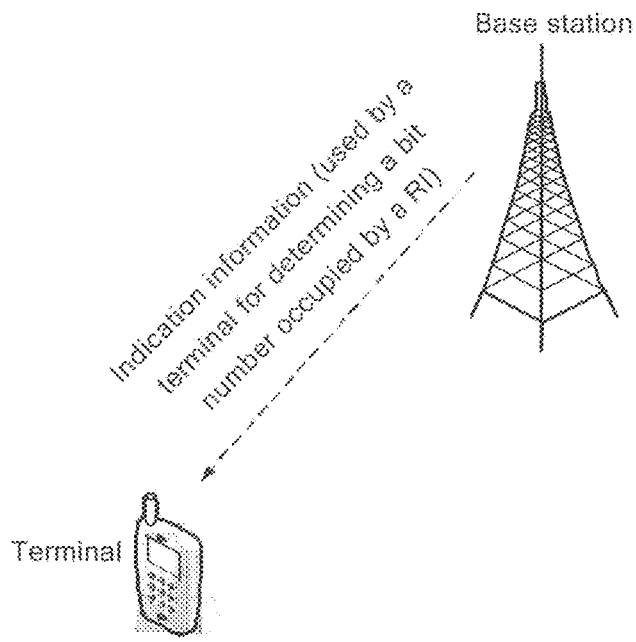
FIG. 1 is a schematic diagram illustrating a principle of an embodiment of a method for determining a rank indication RI bit number according to the present invention.
FIG. 2 is a schematic flowchart of an embodiment of a method for determining a RI bit number according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood by persons skilled in the art that the accompanying drawings are merely schematic diagrams of an exemplary embodiment, and modules or processes in the accompanying drawings are not necessarily required in implementing the present invention.

The present document describes various aspects with reference to a terminal and/or a base station.

The terminal refers to a device providing voice and/or data connectivity for a user, and may be a wireless terminal or a wired terminal. The wireless terminal may be a handheld device with a wireless connection function or another processing device that is connected to a wireless modem, which is a mobile terminal communicating with one or more core networks through a radio access network. For example, the wireless terminal may be a mobile phone (or referred to as a "cellular" phone) and a computer with a mobile terminal. For another example, the wireless terminal may be a portable, pocket, handheld, computer-embedded, or vehicle-mounted mobile apparatus. For still another example, the wireless terminal may be a mobile station (English: mobile station), an access point (English: access point), or a user equipment (English: user equipment, UE for short). For ease of description, the foregoing terminals are collectively referred to as UEs in each of the embodiments of the present invention.

The base station may be a device that communicates with the wireless terminal through one or more cells on an air interface in an access network. For example, the base station may be a base transceiver station (English: base transceiver station, BTS for short) in the GSM or CDMA, a NodeB (English: NodeB) in the WCDMA, an evolved NodeB (eNB or e-NodeB for short) in the LTE, or a base station in a subsequently evolved network, which is not limited in the present invention.

The embodiments of the present invention mainly describe a method for determining, by a base station and a UE, a bit number occupied for sending a RI. Before describing the method for determining a RI bit number in the embodiments of the present invention, in order to make solutions in the embodiments of the present invention clearer, some basic concepts in RI reporting are defined:

In a MIMO technology, a UE needs to report a RI to a base station, so that the base station performs adaptive modulation and coding according to the RI, so as to adapt to a radio condition. When the UE reports the RI, the UE performs coding according to a certain bit number occupied by the RI and sends the RI to the base station, and the base station performs decoding according to the bit number to obtain the RI.

A MIMO capability of a terminal is a superordinate concept of the maximum number of supported MIMO layers of the terminal, and the MIMO capability is configured based on different scenarios of inter-band carrier aggregation (Carrier Aggregation, CA for short)/intra-band contiguous CA/intra-band non-contiguous CA/non-CA.

In a 3GPP Release 8/9 version, if port configuration of an antenna is not considered (that is, the base station has 8 ports by default), when the maximum number of MIMO layers is 2, the bit number occupied by a RI is 1 bit; when the maximum number of MIMO layers is 4, 2 bits are occupied; and when the maximum number of MIMO layers is 8, 3 bits are occupied. Accordingly, the UE determines the bit number occupied by the RI and performs coding, and accordingly, the base station determines the bit number of the RI and performs decoding. The maximum number of MIMO layers supported by the UE is determined by a Category (UE category) of the UE. Although the UE may support different bands (bands), the UE has a same MIMO capability (that is, the maximum number of MIMO layers supported by the UE at all supported bands is the same). In other words, in the Release 8/9 version, the foregoing MIMO capability is at a UE level. For example, if a Category value of the UE is 5, the corresponding maximum number of MIMO layers is 4, and the bit number occupied by the RI and corresponding to the maximum number of MIMO layers 4 is 2, the UE may determine that when sending the RI to the base station, the RI occupies 2 bits for coding.

In a 3GPP Release 10 version, a band combination (band combination) information element is newly introduced in an access capability of the UE, and the information element may indicate the MIMO capability of the UE at different bands, and the maximum number of supported MIMO layers that is corresponding to different bands is different. That is, the MIMO capability is at a band level (Note: In Release 10, a band combination parameter and a category parameter both exist in the access capability of the UE). The bit number occupied by the RI is relevant to the maximum number of MIMO layers that the UE supports at a band at which a current serving cell is located. For example, if the maximum number of MIMO layers that is indicated by the band combination of the UE is 8, the bit number occupied by the RI and corresponding to the number of MIMO layers 8 is 3, and the UE performs coding according to that the RI occupies 3 bits.

The foregoing terminal category (UE category) is a part of the UE access capability, and the band combination (band combination) is also a part of the UE access capability. The UE access capability further includes a version number of the UE. The UE access capability is a static capability, and when the UE is powered on, the UE access capability is sent to a mobility management entity (mobility management entity, MME for short) for storage. When the UE initiates radio resource control (radio resource control, RRC for short) connection setup, the base station acquires the UE access capability from the MME.

The following describes in detail a method for determining a RI bit number, and improvement solutions at a base station side and a terminal side in the embodiments of the present invention.

Embodiment 1

FIG. 1 is a schematic diagram illustrating a principle of an embodiment of a method for determining a rank indication RI bit number according to the present invention, and FIG. 2 is a schematic flowchart of an embodiment of a method for determining a RI bit number according to the present invention. The method in this embodiment is performed by a base station, and a UE is referred to as a terminal in the embodiment of the present invention. As shown in FIG. 2, the method includes:

201. A base station determines indication information according to a correspondence between a terminal and the base station and a multi-input multi-output MIMO capability of the terminal, where the indication information includes information used by the terminal for determining a bit number occupied for sending a RI.

In the embodiment of the present invention, the bit number occupied by the RI when the UE side sends the RI is determined by the UE according to the indication information sent by the base station. In this step, the base station determines the indication information according to the correspondence between the terminal and the base station, and the MIMO capability of the terminal.

Optionally, the base station may determine the indication information according to the following manner: when the terminal matches the base station, determining the indication information based on a multi-input multi-output MIMO capability indicated by a terminal category of the terminal or a MIMO capability indicated by a band combination of the terminal.

Optionally, the base station may also determine the indication information according to the following manner: when the terminal does not match the base station, determining the indication information based on a MIMO capability indicated by a terminal category of the terminal.

In the foregoing two alternative manners, a meaning of the "match" is: for example, a 3GPP Release version of the base station is the same as that of the terminal (for example, both a type of the base station and a type of the terminal are a Release 10 version), and then it is said that the base station matches the terminal. If the Release version of the base station is different from that of the terminal (for example, the type of the base station is the Release 10 version, while the type of the terminal is a Release 8 version), and then it is said that the base station does not match the terminal. For another example, whether the base station matches the terminal may be reflected by capabilities of the two. For example, the UE has a band combination capability, and the base station can perform decoding correctly, which also indicates that the base station matches the UE.

An example is provided below to illustrate that the base station determines indication information according to whether the base station matches the terminal:

For example, if the base station matches the terminal, and both are of the Release 10 version, the base station may determine the indication, information based on the terminal category or band combination. If the base station matches the terminal, and both are of the Release 8/9 version, the base station may determine the indication information based on the terminal category.

For another example, if the base station does not match the terminal, such as that the base station version is earlier than or later than the terminal version, the base station may determine the indication information based on the terminal category. Optionally, when the base station version is later than the terminal version, or the base station version is the same as the terminal version, the base station and the terminal may determine the bit number based on the terminal category separately, and the base station does not need to send the indication information to the terminal. In addition, the later or earlier in the version may be determined according to the Release 10 version. For example, if the base station is of the Release 10 version or a later version, and the terminal is of a Release 9 version or an earlier version, the base station version is later than the terminal version. In this case, it may also be said that the base station is a base station of a later version, and that the terminal is a terminal of an earlier version.

The base station determines, according to whether the base station matches the terminal, to calculate, based on which MIMO capability, the bit number occupied by the RI, and sends the indication information to the terminal, so that the base station and the terminal have a determination basis for determining the RI, and both the base station and the terminal calculate the RI bit number according to the determination basis. In this way, it can be ensured that the RI bit quantities determined by the base station and the terminal are the same, so that the base station can understand the RI sent by the terminal, thereby ensuring normal implementation of a MIMO function between the two.

202. Send the indication information to the terminal, so that the terminal determines, according to the indication information, the bits occupied for sending the RI.

The base station sends the determined indication information to the UE, where the indication information is used by the terminal to determine the bit number occupied by the RI, that is, the base station ensures, by using the indication information, that the bit quantities occupied by the RI and determined by the UE and the base station are the same.

As described in 201, the base station may determine the indication information based on the MIMO capability indicated by the terminal category of the terminal, or determine the indication information based on the MIMO capability indicated by the band combination of the terminal. The basis for determining the indication information is different, and then the sent indication information may also be different. For example, indication information determined based on the MIMO capability indicated by the terminal category is different from indication information determined based on the MIMO capability indicated by the band combination. In addition, the base station may use information in multiple manners as the indication information:

Optionally, the indication information determined by the base station may include: CQI report configuration information. Specifically, given the indication, information of this type, the following two alternative manners may be adopted:

A first manner is: when the indication information is determined based on the MIMO capability indicated by the band combination of the terminal, the base station may send first CQI report configuration information to the terminal, so that the terminal determines the bit number according to the first CQI report configuration information; or when the indication information is determined based on the MIMO capability indicated by the terminal category of the terminal, second CQI report configuration information is sent to the terminal, so that the terminal determines the bit number according to the second CQI report configuration information.

For example, the first CQI report configuration information may be CQI report configuration information of a 3GPP Release 10 or later version, and the second CQI report configuration information may be CQI report configuration information of a 3GPP Release 10 or earlier version.

An advantage of this manner is that implementation is relatively simple, where different bases for determining the RI bit number may be indicated by sending CQI report configuration information of different versions.

Optionally, the base station may also determine the indication information according to the capability of the terminal (for example, the base station may determine, according to a terminal version in an acquired terminal capability, that the terminal is of a later version). It is also possible that the terminal is of a later version, but the UE capability acquired by the base station has no combination (the UE capability does not support a band combination). In this case, even if the base station sends CQI report configuration information of a release 10 or later version to the UE, the UE determines the bit number still according to the MIMO capability indicated by the terminal category, and the base station also determines the bit number according to the MIMO capability indicated by the terminal category.

A second manner is: when the indication information is determined based on the MIMO capability indicated by the band combination of the terminal, carrying first information in the CQI report configuration information, where the first information is used to instruct the terminal to determine the bit number based on the MIMO capability indicated by the band combination of the terminal; when the indication information is determined based on the MIMO capability indicated by the terminal category of the terminal, not carrying the first information in the CQI report configuration information, where the CQI report configuration information is used to instruct the terminal to determine the bit number based on the MIMO capability indicated by the terminal category of the terminal; or when the indication information is determined based on the MIMO capability indicated by the terminal category of the terminal, carrying second information in the CQI report configuration information, where the second information is used to instruct the terminal to determine the bit number according to the MIMO capability indicated by the terminal category.

For example, in the second manner, the first information or the second information may use a bit to indicate information. For example, "0" may be used to indicate the MIMO capability indicated by the terminal category, and "1" may be used to indicate the MIMO capability indicated by the band combination. If the base station selects to determine, based on the MIMO capability indicated by the terminal category, the bit number occupied by the RI, "0" may be sent to serve as the second information. If the base station selects to determine, based on the MIMO capability indicated by the band combination, the bit number occupied by the RI, "1" may be sent to serve as the first information.

The implementation manner of the second manner is relatively flexible, and an indication of a different basis for determining the RI bit number is relatively obvious, so that the base station may select different manners flexibly.

Optionally, the indication information determined by the base station may include: CA indication information.

Specifically, given the indication information of this type, the base station may send the CA indication information to the terminal, where the CA indication information is used to instruct the terminal to determine the bit number according to the MIMO capability indicated by the band combination of the terminal.

Optionally, the indication information sent by the base station to the terminal may directly be the bit number occupied by the RI sent by the terminal.

In this case, after the base station itself determines, according to the correspondence between the terminal and the base station (for example, whether the base station matches the terminal), to determine the indication information based on the MIMO capability indicated by the terminal category or the MIMO capability indicated by the band combination, the base station itself calculates, according to the MIMO capability indicated by the terminal category or band combination, the bit number occupied by the RI, and sends the bit number to the UE, and the UE can directly encode the RI according to the bit number for sending.

A difference between this manner and the previous manner lies in that, in the previous manner, the UE selects a Category or a band combination according to the indication information, and then the UE determines, according to a finally determined Category or band combination, the bit number occupied by the RI, while in this manner, the UE performs coding directly according to the bit number occupied by the RI and delivered by the base station, where the bit number occupied by the RI is obtained by the base station by calculation and directly sent to the UE. An advantage of the manner of directly sending the bit number is: processing at the terminal side is simplified greatly, and the terminal side may directly encode the RI according to the bit number after receiving the bit number, and does not need to calculate or determine the RI bit number. In addition, processing at the base station side may also be simplified to a certain extent, because the base station side also needs to determine the RI bit number when decoding the RI. If the bit number is sent to the UE directly, the indication information does not need to be designed additionally.

Optionally, when the base station itself calculates the RI bit number, the following case may occur: When the bit number is determined based on the MIMO capability indicated by the band combination of the terminal, if a band combination currently used by the terminal includes a band that appears at least two times, the bit number corresponding to the band is determined based on a maximum value of the maximum number of supported MIMO layers that is indicated by the band, thereby ensuring that the base station and the terminal calculate the RI bit number based on a determined determination basis.

Optionally, before sending the indication information to the terminal, the base station determines the bit number based on the MIMO capability indicated by the terminal category of the terminal; or after sending the indication information to the terminal, the base station determines the bit number based on the correspondence between the terminal and the base station.

In addition, the base station itself also determines, based on the MIMO capability indicated by the terminal category or the MIMO capability indicated by the band combination, the bit number occupied by the RI, and when receiving the RI reported by the UE, the base station performs decoding according to the bit number to obtain the RI. Because the base station and the UE determine, based on the same basis, the bit number occupied by the RI, that is, the determination bases are the same, the base station and the UE have a same determination result on the bit number occupied by the RI, thereby ensuring correct decoding of the RI by the base station and normal implementation of the MIMO function. The base station in this embodiment determines, according to the foregoing manner, the bit number occupied by the RI, and sends the indication information to the terminal, where a sequence for performing the two actions is not limited in the embodiment of the present invention.

By determining the RI bit number according to the method in this embodiment, it may be ensured that the base station and the terminal side agree on understanding of the bit number occupied by the RI. For example, in a current standard protocol, the base station can learn a version number of the UE, but the UE cannot learn a version number of the base station; and therefore, when a UE of a Rel-10 or later version accesses a base station of Rel-8/9, the UE may report a band combination and a category simultaneously, but determines the bit number occupied by the RI according to the maximum number of supported MIMO layers that is indicated by the band combination. However, the base station of an earlier version Rel-8/9 cannot recognize a band combination information element newly introduced in Rel-10, and can only determine the RI bit number according to the maximum number of supported MIMO layers that is corresponding to a Category value of the UE. Therefore, the base station and the UE have different understanding of the bit number occupied by the RI. For example, the Category value reported by the UE is filled with 5, and the corresponding maximum number of supported MIMO layers is 4 layers, but the band combination reported by the UE indicates that the maximum number of supported MIMO layers that is corresponding to a current band is 8 layers. In this case, when encoding the RI, the UE determines, according to the band combination, that the RI occupies 3 bits; however, when performing decoding, the base station considers, according to the Category value, that the RI occupies 2 bits, resulting in that the base station obtains an incorrect value by decoding, and cannot correctly obtain the RI reported by the UE, so that the MIMO function between the base station and the UE cannot be used normally. By using the method in this embodiment, because actually both the base station and the terminal determine the RI bit number according to the indication information, it can be ensured that the base station correctly decodes the RI sent by the terminal, and the MIMO function can be normally used between the base station and the UE based on a correct RI.

Embodiment 2

Figure 3:
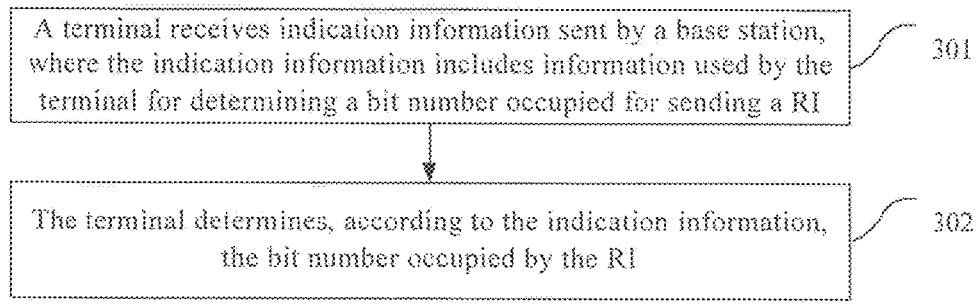
FIG. 3 is a schematic flowchart of another embodiment of a method for determining a RI bit number according to the present invention.

FIG. 3 is a schematic flowchart of another embodiment of a method for determining a RI bit number according to the present invention. The method in this embodiment is performed by a UE, and as shown in FIG. 3, the method includes:

301. A terminal receives indication information sent by a base station, where the indication information includes information used by the terminal for determining a bit number occupied for sending a RI.

A UE receives the indication information sent by the base station, where the indication information is used to determine the bit number occupied by the RI. The base station instructs the UE to determine, according to the indication information, the bit number occupied by the RI, and also indicates that the base station itself determines, according to the indication information, the bit number occupied by the RI.

The indication information may have multiple forms, for example, bit "0" or "1" may be used for indication, and the bit number occupied by the RI and determined by the base station may also be directly used as the indication information.

302. The terminal determines, according to the indication information, the bit number occupied by the RI.

After receiving the indication information, the UE determines, according to the indication information, the bit number occupied by the RI. For example, if the UE receives "0" sent by the base station (indicating that a MIMO capability indicated by a terminal category is selected), accordingly, the UE determines to select the Category as a basis to determine the RI bit number. Alternatively, if the indication information sent by the base station and received by the UE is the bit number occupied by the RI (the bit number is determined by the base station and sent to the UE directly), the RI is encoded directly according to the bit number for sending.

When sending the RI, the UE encodes, according to the bit number, the RI sent to the base station.

In the method for determining a rank indication RI bit number in this embodiment, the terminal determines, according to the indication information sent by the base station, the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

In the following embodiments, several specific examples are used to describe a manner in which a base station and a UE determine a RI bit number, where indication information in a part of the embodiments is specifically used by the UE to select a determination basis, and determine, according to the determination basis, the bit number occupied by the RI, while in other embodiments, the indication information is directly the bit number occupied by the RI and determined by the base station according to the determination basis. The determination basis herein refers to a MIMO capability indicated by a terminal category of the terminal or a MIMO capability indicated by a band combination of the terminal.

Embodiment 3

Indication information in this embodiment includes CQI report configuration information of different versions. That is, a base station sends CQI report configuration information of different versions to a UE as the indication information, and the UE can know, according to the CQI report configuration information of the different versions, that a MIMO capability indicated by a terminal category or a MIMO capability indicated by a band combination need to serve as the determination basis for determining a bit number occupied by a RI.

Figure 4:
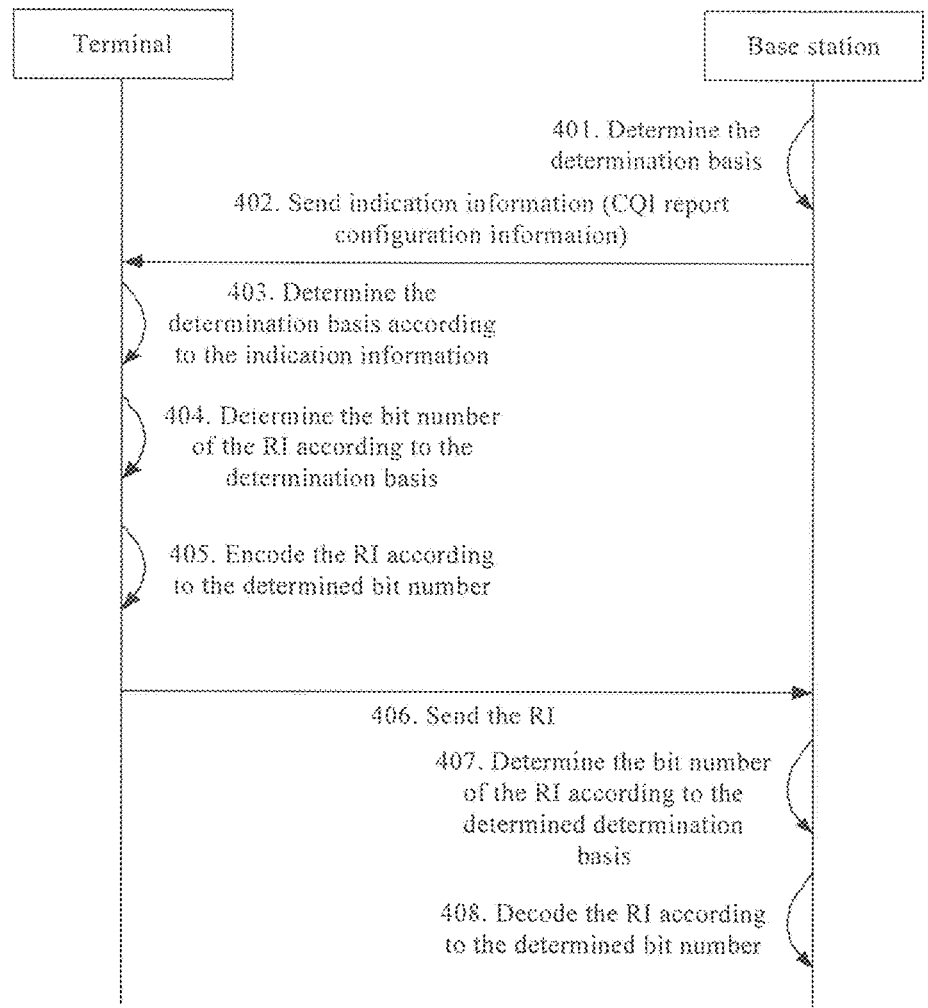
FIG. 4 is a schematic signaling diagram of still another embodiment of a method for determining a RI bit number according to the present invention.

FIG. 4 is a schematic signaling diagram of still another embodiment of a method for determining a RI bit number according to the present invention. As shown in FIG. 4, the method may include:

401. A base station determines a determination basis used to determine a bit number occupied by a RI.

The base station may select a determination basis in multiple manners, for example, the base station may determine a determination basis according to a correspondence between a terminal and the base station.

Optionally, when the terminal matches the base station (the base station can learn a version of the UE), the base station selects to determine indication information based on a MIMO capability indicated by a terminal category of the terminal or a MIMO capability indicated by a band combination of the terminal. When the terminal does not match the base station, the base station selects to determine the indication information based on the MIMO capability indicated by the terminal category of the terminal.

For example, for a base station of a Release 8/9 version, because the base station does not support a band combination manner introduced in a Release 10 version, the base station selects the terminal category as the determination basis. For example, when the base station matches the terminal, both the terminal and the base station are of the Release 8/9 version, the UE Category is certainly selected as the determination basis. When the base station does not match the terminal, the terminal is of the Release 10 version, but the base station does not support the band combination manner, the UE Category is also selected as the determination basis.

For another example, for a base station of the Release 10 version, when the base station matches the terminal, both the terminal and the base station are of the Release 10 version, and the base station may select the Category or band combination manner. When the base station does not match the terminal, the UE is of the Release 8/9 version. Because the UE version is earlier and does not support the band combination manner introduced in the Release 10 version, the base station also selects the terminal category as the determination basis.

402. The base station sends the indication information to the UE according to the determined determination basis.

The indication information is information used to determine the bit number occupied by the RI. The indication information in this embodiment is specifically information used by the terminal to determine to select which determination basis. After the determination basis is determined, the UE determines, according to the determination basis, the bit number occupied by the RI. The indication information in this embodiment is CQI report configuration information of different versions.

For example, if the determination basis determined by the base station is the MIMO capability indicated by the band combination (band combination) of the UE, the base station sends first CQI report configuration information to the UE, where the first CQI report configuration information is, for example, CQI report configuration information of the Release 10 version or a later version, and the CQI report configuration information of the Release 10 version specifically refers to an information element cqi-ReportConfig-r 10.

If the determination basis determined by the base station is the MIMO capability indicated by the terminal category (Category) of the UE, the base station sends second CQI report configuration information to the UE, where the second CQI report configuration information is, for example, CQI report configuration information of a version earlier than Release 10. The CQI report configuration information of a version earlier than Release 10 specifically refers to an information element cqi-Report-Config (without a version suffix).

Optionally, two air interface messages may carry the indication information, that is, the CQI report configuration information. For example, it may be a radio resource control (Radio Resource Control, RRC for short) connection setup message (RRC Connection Setup) or an RRC connection reconfiguration message (RRC Connection Reconfiguration) sent by the base station to the terminal. The RRC connection setup message is sent by the base station when the UE enters a connected state from an idle state. The RRC connection reconfiguration message is sent by the base station when the UE is in the connected state. In specific implementation, the indication information may also be carried in another message and sent to the UE, and for example, the indication information is sent independently by using a certain message.

403 The UE selects, according to the received indication information sent by the base station, a determination basis to be used.

The UE in this embodiment is capable of selecting, according to CQI report configuration information of different versions sent by the base station, a determination basis to be used. That is, the MIMO capability indicated by the terminal category of the UE or the MIMO capability indicated by the band combination is selected as the determination basis.

For example, if the indication information received by the UE is the first CQI report configuration information, where the first CQI report configuration information is, for example, CQI report configuration information of the Release 10 version or a later version, the UE selects the MIMO capability indicated by the band combination as the determination basis. If the indication information received by the UE is the second CQI report configuration information, where the second CQI report configuration information is, for example, CQI report configuration information of a version earlier than Release 10, the UE selects the MIMO capability indicated by the terminal category as the determination basis.

404. The UE determines, according to the determined determination basis, the bit number occupied by the RI.

If the UE selects the MIMO capability indicated by the terminal category as the determination basis, the maximum number of supported MIMO layers that is corresponding to a Category value (Category 1-5) is used to calculate the bit number occupied by the RI. If the UE selects the MIMO capability indicated by the band combination as the determination basis, the MIMO capability indicated by the band combination is used to calculate the bit number occupied by the RI.

405. The UE encodes the RI according to the bit number.

406. The UE sends the RI to the base station.

407. The base station determines, according to the determined determination basis, the bit number occupied by the RI.

408. The base station, uses the bit number to decode the RI when receiving the RI sent by the UE.

The embodiment of the present invention does not limit an execution sequence of the foregoing 407 and 408. For example, 408 in which the base station decodes the RI according to the bit number is performed after step 406, but 407 in which the bass station determines, according to the determination basis, the bit number occupied by the RI may just be performed before step 408, and is not necessarily performed after step 406. For example, the base station may also perform step 407 after determining the determination basis in 401, and before sending the indication information in 402 (which is just used as an example, and the step may also be performed at other time in specific implementation).

In the method for determining a rank indication RI bit number in this embodiment, the terminal determines, according to the indication information sent by the base station, the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

Embodiment 4

Indication information in this embodiment also includes CQI report configuration information, but some new information is introduced in the CQI report configuration information, for notifying a UE which determination basis is to be selected.

Figure 5:
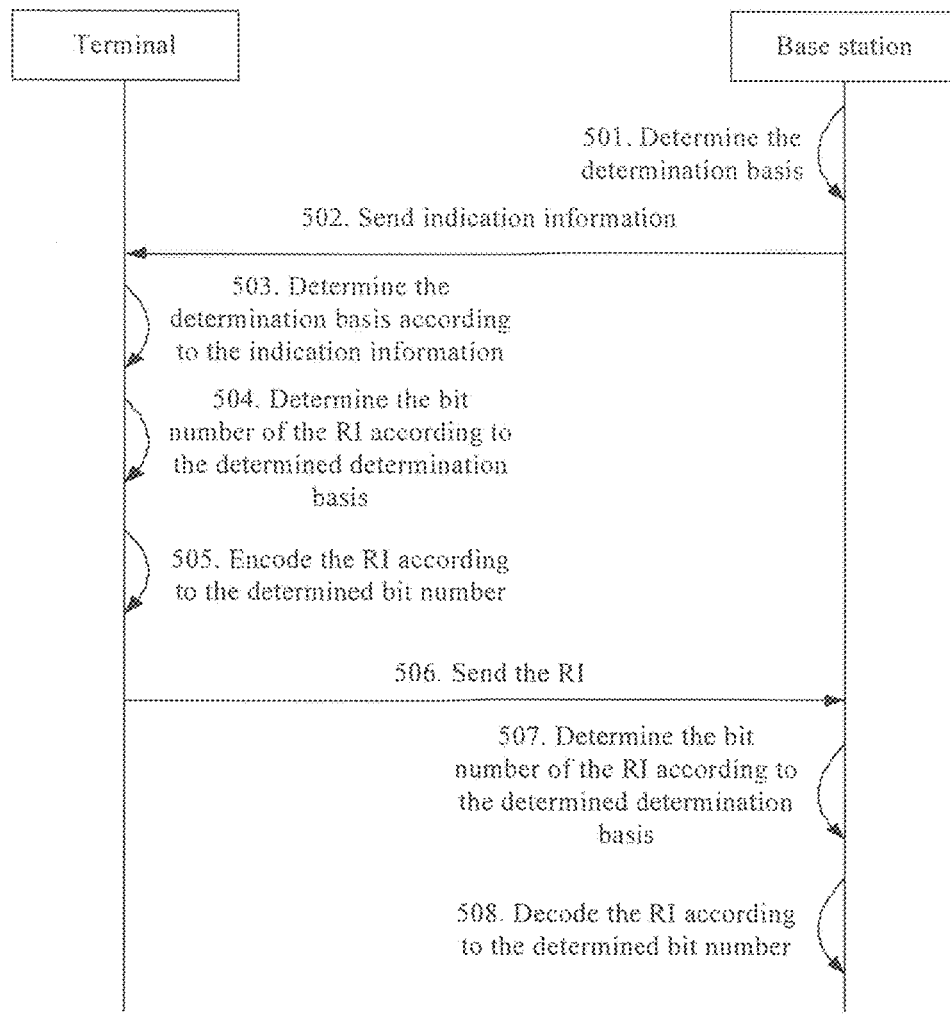
FIG. 5 is a schematic signaling diagram of still another embodiment of a method for determining a RI bit number according to the present invention.

FIG. 5 is a schematic signaling diagram of still another embodiment of a method for determining a RI bit number according to the present invention. In this embodiment, steps same as those of the embodiment in FIG. 4 are not repeated. As shown in FIG. 5, the method may include:

501. A base station determines a determination basis used to determine a bit number occupied by a RI.

502. The base station sends indication information to the UE according to the determined determination basis.

The indication information in this embodiment is information newly added in the CQI report configuration information, and there are multiple manners used by the base station to send the indication information according to different determined determination bases:

For example, if the determination basis determined by the base station is a MIMO capability indicated by a band combination (band combination) of the UE, the base station carries first information in the CQI report configuration information sent to the UE, where the first information is used to instruct the terminal to determine the bit number based on the MIMO capability indicated by the band combination of the terminal. If the determination basis determined by the base station is a MIMO capability indicated by a terminal category (Category) of the UE, the base station does not carry the first information in the CQI report configuration information sent to the UE, where the CQI report configuration information is used to instruct the terminal to determine the bit number based on the MIMO capability indicated by the terminal category of the terminal.

For another example, if the determination basis determined by the base station is the MIMO capability indicated by the terminal category (Category) of the UE, the base station carries second information (for example, "01" or "b") in the CQI report configuration information sent to the UE, where the second information is used to instruct the terminal to determine the bit number according to the MIMO capability indicated by the terminal category.

Likewise, the indication information may be carried in an RRC connection setup message or an RRC connection reconfiguration message.

503. The UE selects, according to the received indication information sent by the base station, a determination basis to be used.

The UE in this embodiment is capable of selecting, according to different manners in which the base station sends basis indication information, a determination basis to be used. That is, the MIMO capability indicated by the terminal category of the UE or the MIMO capability indicated by the band combination of the UE is selected as the determination basis.

For example, if the CQI report configuration information received by the UE carries first information, where the first information is used to instruct the terminal to determine the bit number based on the MIMO capability indicated by the band combination of the terminal, the UE selects the MIMO capability indicated by the band combination as the determination basis. Alternatively, if the CQI report configuration information received by the UE does not carry the first information, the UE selects the MIMO capability indicated by the terminal category as the determination basis.

For another example, if the CQI report configuration information received by the UE carries second information, where the second information is used to instruct the terminal to determine the bit number according to the MIMO capability indicated by the terminal category, the UE selects the MIMO capability indcted by the terminal category as the determination basis.

504. The UE determines, according to the determined determination basis, the bit number occupied by the RI.

505. The UE encodes the RI according to the bit number.

506. The UE sends the RI to the base station.

507. The base station determines, according to the determined determination basis, the bit number occupied by the RI.

508. The base station uses the bit number to decode the RI when receiving the RI sent by the UE.

In the method for determining a rank indication RI bit number in this embodiment, the terminal determines, according to the indication information sent by the base station, the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

Embodiment 5

Indication information in this embodiment includes carrier aggregation (Carrier Aggregation, CA for short) indication information. That is, a UE may determine, according to CA indication information sent by a base station, to select a terminal category manner or a band combination manner as a determination basis. The CA indication information may include CA configuration information and CA release information, where the CA configuration information is configuration information instructing the UE to add a secondary serving cell, and the CA release information is configuration information indicating that a last secondary serving cell is deleted.

Figure 6:
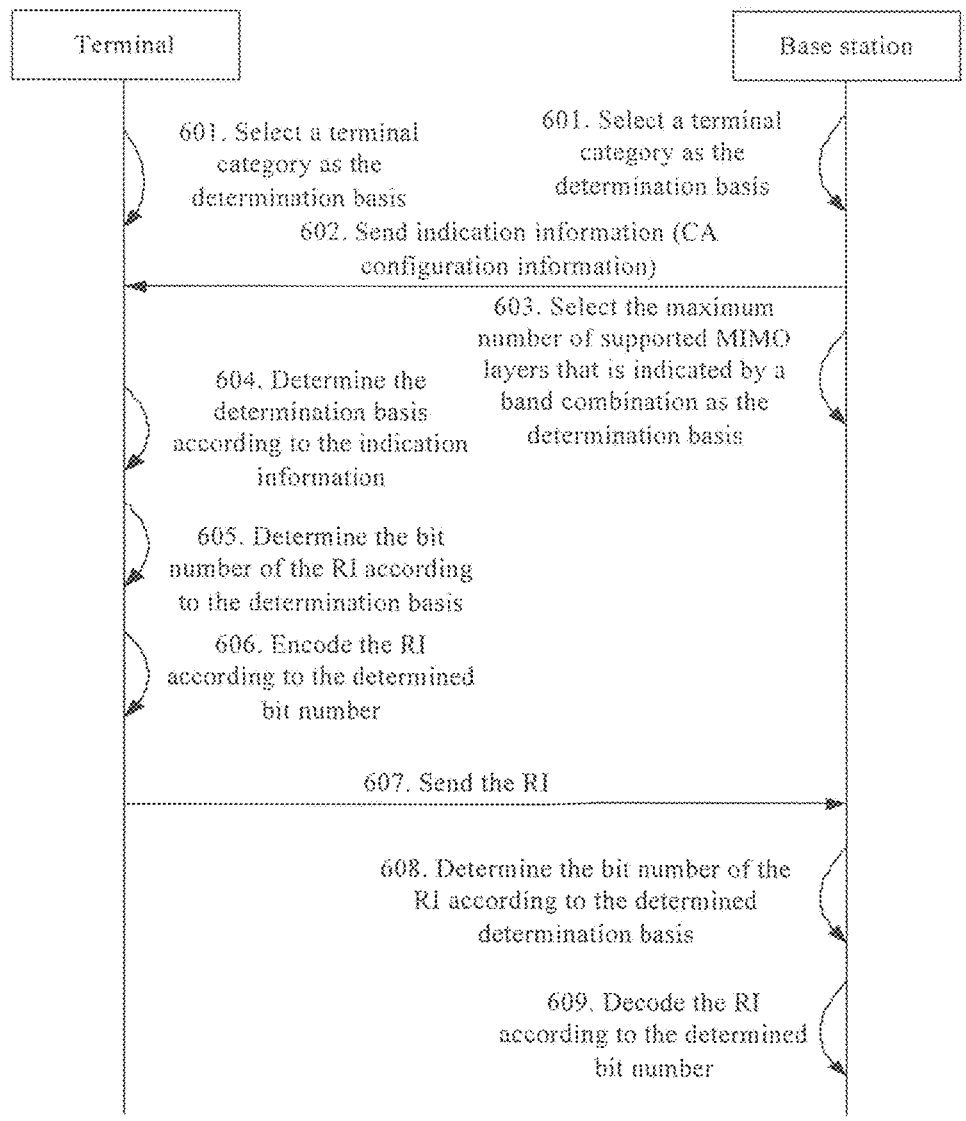
FIG. 6 is a schematic signaling diagram of still another embodiment of a method for determining a RI bit number according to the present invention.

FIG. 6 is a schematic signaling diagram of still another embodiment of a method for determining a RI bit number according to the present invention. As shown in FIG. 6, the method may include:

601. Both a base station and a UE select a MIMO capability indicated by a terminal category of a terminal as a determination basis.

In this embodiment, before CA is configured, both the UE and the base station may use, by default, a MIMO capability corresponding to a Category value (Category 1-5) to calculate a bit number occupied by a RI.

It should be noted that, in embodiments of FIG. 4 and FIG. 5, before the base station sends indication information to the UE, both the base station and the UE may select, by default, the MIMO capability indicated by the terminal category of the terminal as a determination basis. After the base station sends the indication information, the UE and the base station calculate, according to a determination basis corresponding to the indication information, the bit number occupied by the RI. That is, a manner in this step may be applicable to any embodiment of the present invention.

602. The base station sends CA configuration information to the UE.

The base station can recognize a UE version. If the base station recognizes that the UE is a terminal of a Release 10 version, which is a later version, the base station may send the CA configuration information to the UE, instructing the UE to communicate by using a carrier aggregation manner. The CA configuration information is the indication information sent by the base station to the UE.

The CA configuration information may be carried in an RRC connection reconfiguration message, and the CA configuration information may specifically be an information element relevant to secondary serving cell addition SCell Addition.

603. The base station determines to use a MIMO capability indicated by a band combination of the terminal as the determination basis.

When the base station recognizes the version of the UE and sends the CA configuration information to the UE, the base station itself selects to use the MIMO capability indicated by the band combination of the terminal as the determination basis, because the UE is a terminal of a later version and can support the band combination manner.

604. The UE selects, according to the received indication information sent by the base station, a determination basis to be used.

For example, it the CA indication information received by the UE is the CA configuration information, the MIMO capability indicated by the band combination is selected as the determination basis.

605. The UE determines, according to the determined determination basis, the bit number occupied by the RI.

606. The UE encodes the RI according to the bit number.

607. The UE sends the RR to the base station.

608. The base station determines, according to the determined determination basis, the bit number occupied by the RI.

609. The base station uses the bit number to decode the RI when receiving the RI sent by the UE.

Optionally, after the UE receives the CA configuration information sent by the base station in 602, regardless of whether the base station sends UE release information, subsequently, that is, regardless of whether the UE configures, the CA or does not configure the CA subsequently, the MIMO capability indicated, by the band, combination keeps being used as the determination basis, until a connection between the UE and the base station is released or the UE is handed over to another base station, Optionally, after the UE receives the CA configuration information sent by the base station in 602, if the UE receives the CA release information sent by the base station, the UE may select, according to the CA release information, the MIMO capability indicated by the terminal category as the determination basis, and the base station uses the MIMO capability indicated by the terminal category as the determination basis after sending the CA release information to the UE. That is equivalent to the following: If the CA is configured, both the base station and the UE use the band combination manner to determine the bit number occupied by the RI, and if the CA is not configured, both the base station and the UE use the Category to determine the bit number occupied by the RI.

In the method for determining a rank indication RI bit number in this embodiment, the terminal determines, according to the indication information sent by the base station, the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

Embodiment 6

Indication information in this embodiment includes a determined bit number occupied by a RI. That is, a base station itself obtains, according to the determined determination basis, a bit number occupied by a RI, and uses the bit number as indication information to be sent to a UE directly. The UE does not need to select a determination basis, but encodes the RI according to the bit number directly.

Figure 7:
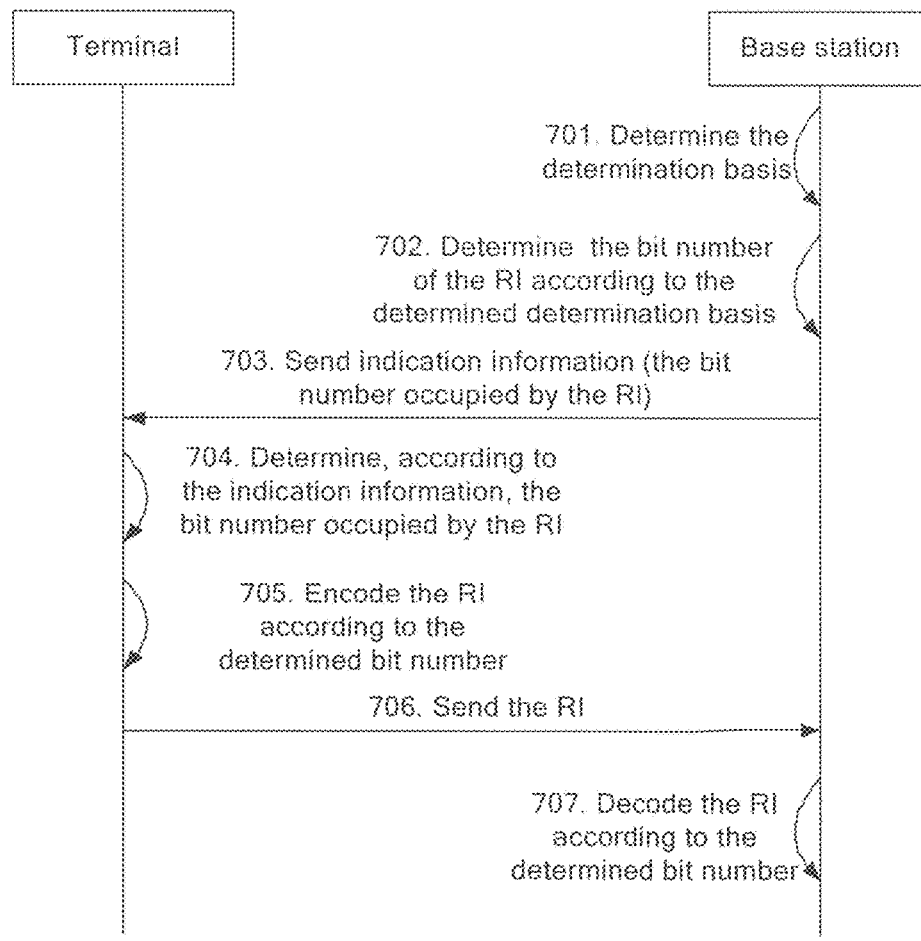
FIG. 7 is a schematic signaling diagram of still another embodiment of a method for determining a RI bit number according to the present invention.

FIG. 7 is a schematic signaling diagram of still another embodiment of a method for determining a RI bit number according to the present invention. As shown in FIG. 7, the method may include:

701. A base station determines a determination basis used to determine a bit number occupied by a RI.

702. The base station determines, according to the determined determination basis, the bit number occupied by the RI.

703. The base station sends the determined bit number occupied by the RI to a UE.

The basis indication information may be carried in an RRC connection setup message or an RRC connection reconfiguration message.

704. The UE determines, according to the indication information, the bit number occupied by the RI.

The UE may directly use the bit number sent by the base station as the bit number occupied by the RI and determined by the UE itself.

705. The UE encodes the RI according to the bit number.
706. The UE sends the RI to the base station.
707. The base station uses the bit number to decode the RI when receiving the RI sent by the UE.

In the method for determining a rank indication RI bit number in this embodiment, the terminal determines, according to the indication information sent by the base station, the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

Embodiment 7

A method for determining a RI bit number in the following case is described in this embodiment: Assuming that both a base station and a UE use the maximum number of supported MIMO layers that is indicated by a band combination to determine a bit number occupied by a RI, the UE may report the band combination and the corresponding maximum number of supported MIMO layers when reporting to the base station. Generally, the reported band combination has only one band, and therefore the maximum number of supported MIMO layers is the number of layers corresponding to the band. However, a special case is: a current band combination of the UE includes a band that appears at least two times.

In this case, if the maximum number of supported MIMO layers that is indicated by the band (band) each time is different (a current standard protocol supports implementation of this by a terminal manufacturer), this embodiment specifies that a maximum value of the maximum number of supported MIMO layers that is indicated by the band that appears at least two times is selected as the determination basis. For example, if the band combination includes band1 (a) and band1 (b), the number of MIMO layers that is indicated by band1 (a) is 4, and the number of MIMO layers that is indicated by band1 (b) is 8, 8 is selected as the maximum number of supported MIMO layers that is indicated by the whole band combination.

If the maximum number of supported MIMO layers that is indicated by the band each time is the same, the same number of MIMO layers is selected as the maximum number of supported MIMO layers that is indicated by the whole band combination. In this case, the same number of MIMO layers may also be understood as the maximum value of the maximum number of supported MIMO layers that is indicated by the foregoing band that appears at least two times. For example, if the band combination includes band1 (a) and band1 (b), the number of MIMO layers that is indicated by band1 (a) is 4, and the number of MIMO layers that is indicated by band1 (b) is 4, 4 is selected as the maximum number of supported MIMO layers that is indicated by the whole band combination.

The case described in this embodiment is applicable to any other embodiment of the present invention.

Embodiment 8

Figure 8:
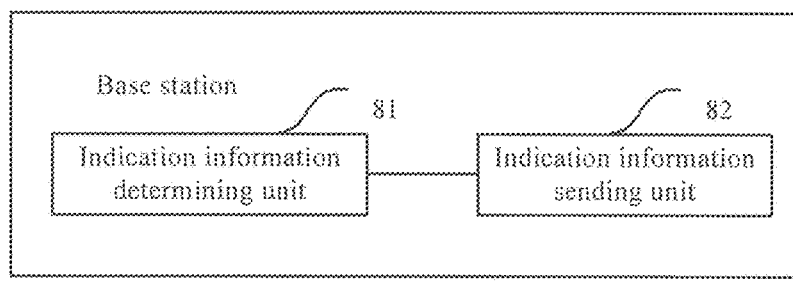
FIG. 8 is a schematic structural diagram of an embodiment of a base station according to the present invention.

FIG. 8 is a schematic structural diagram of an embodiment of a base station according to the present invention, where the base station may perform a method according to any embodiment of the present invention. As shown in FIG. 8, the base station in this embodiment may include an indication information determining unit 81 and an indication information sending unit 82.

The indication information determining unit 81 is configured to determine indication information according to a correspondence between a terminal and the base station and a multi-input multi-output MIMO capability of the terminal, where the indication information includes information used by the terminal for determining a bit number occupied for sending a RI.

The indication information sending unit 82 is configured to send the indication information to the terminal, so that the terminal determines, according to the indication information, the bit number occupied for sending the rank indication RI.

Further, the indication information determining unit 81 is specifically configured to: when the terminal matches the base station, determine the indication information based on a multi-input multi-output MIMO capability indicated by a terminal category of the terminal or a MIMO capability indicated by a band combination of the terminal; or when the terminal does not match the base station, determine the indication information based on a MIMO capability indicated by a terminal category of the terminal.

Further, the indication information determining unit 81 is specifically configured to determine the CA indication information as the indication information, where the CA indication information is used to instruct the terminal to determine the bit number according to the MIMO capability indicated by the band combination of the terminal.

Further, the indication information determining unit 81 is specifically configured to determine the bit number that is occupied by the RI sent by the terminal, as the indication information.

Further, the indication information determining unit 81 is specifically configured to: when the bit number is determined based on the MIMO capability indicated by the band combination of the terminal, if a band combination currently used by the terminal includes a band that appears at least two times, determine, based on a maximum value of the maximum number of supported MIMO layers that is indicated by the band, the bit number corresponding to the band.

Figure 9:
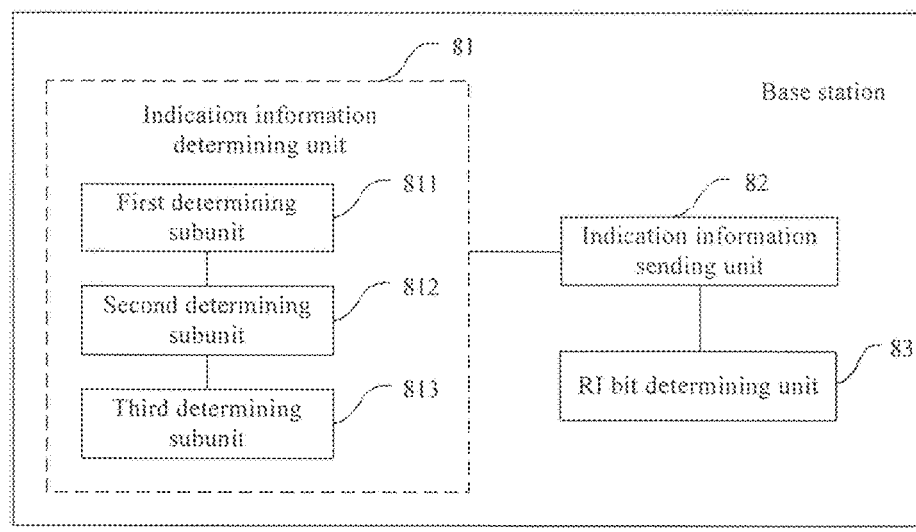
FIG. 9 is a schematic structural diagram of another embodiment of a base station according to the present invention.

FIG. 9 is a schematic structural diagram of another embodiment of a base station according to the present invention. As shown in FIG. 9, an indication information determining unit 81 in the base station may selectively include the following units: a first determining subunit 811, a second determining subunit 812, and a third determining subunit 813.

The first determining subunit 811 is configured to: when the indication information is determined based on the MIMO capability indicated by the band combination of the terminal, determine first CQI report configuration information as the indication information.

The second determining subunit 812 is configured to: when the indication information is determined based on the MIMO capability indicated by the terminal category of the terminal, determine second CQI report configuration information as the indication information.

The third determining subunit 813 is configured to: when the indication information is determined based on the MIMO capability indicated by the band combination of the terminal, determine to carry first information in the CQI report configuration information, where the first information is used to instruct the terminal to determine the bit number based on the MIMO capability indicated by the band combination of the terminal; or when the indication information is determined based on the MIMO capability indicated by the terminal category of the terminal, determine that the CQI report configuration information instructs the terminal to determine the bit number based on the MIMO capability indicated by the terminal category of the terminal; or when the indication information is determined based on the MIMO capability indicated by the terminal category of the terminal, determine to carry second information in the CQI report configuration information, where the second information is used to instruct the terminal to determine the bit number according to the MIMO capability indicated by the terminal category.

Further, the base station may further include a RI bit determining unit 83, configured to: before the indication information is sent to the terminal, determine the bit number based on the MIMO capability indicated by the terminal category of the terminal; or after the indication information is sent to the terminal, determine the bit number based on a correspondence between the terminal and the base station.

The base station in this embodiment sends the indication information to the terminal, for determining the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

Embodiment 9

Figure 10:
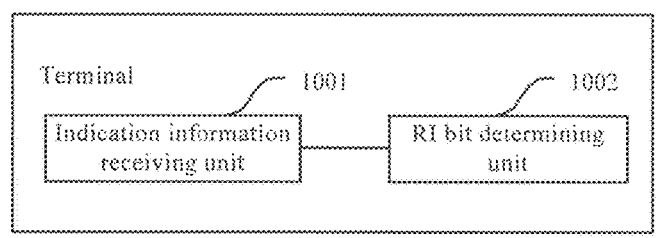
FIG. 10 is a schematic structural diagram of an embodiment of a terminal according to the present invention.

FIG. 10 is a schematic structural diagram of an embodiment of a terminal according to the present invention, and the terminal may perform a method according to any embodiment of the present invention. As shown in FIG. 10, the terminal in this embodiment may include an indication information receiving unit 1001 and a RI bit determining unit 1002.

The indication information receiving unit 1001 is configured to receive indication information sent by a base station, where the indication information includes information used by the terminal for determining a bit number occupied for sending a RI.

The rank indication RI bit determining unit 1002 is configured to determine, according to the indication information, the bit number occupied by the RI.

Further, the RI bit determining unit 1002 is specifically configured to select, according to the indication information received by the indication information receiving unit, to determine the bit number based on a multi-input multi-output MIMO capability indicated by a terminal category or a MIMO capability indicated by a band combination.

Further, the RI bit determining unit 1002 is specifically configured to: when the indication information receiving unit receives the CA indication information sent by the base station, determine the bit number based on the MIMO capability indicated by the band combination.

Further, the RI bit determining unit 1002 is further configured to: when the bit number is determined based on the MIMO capability indicated by the band combination of the terminal, if a currently used band combination includes a band that appears at least two times, determine, based on a maximum value of the maximum number of supported MIMO layers that is indicated by the band, the bit number corresponding to the band.

Further, the RI bit determining unit 1002 is further configured to: before the indication information receiving unit receives the indication information sent by the base station, determine the bit number based on the MIMO capability indicated by the terminal category.

Further, the indication information receiving unit 1001 is specifically configured to receive the bit number occupied by the RI and sent by the base station; and the RI bit determining unit 1002 is specifically configured to use the bit number received by the indication information receiving unit as the bit number occupied by the RI.

Figure 11:
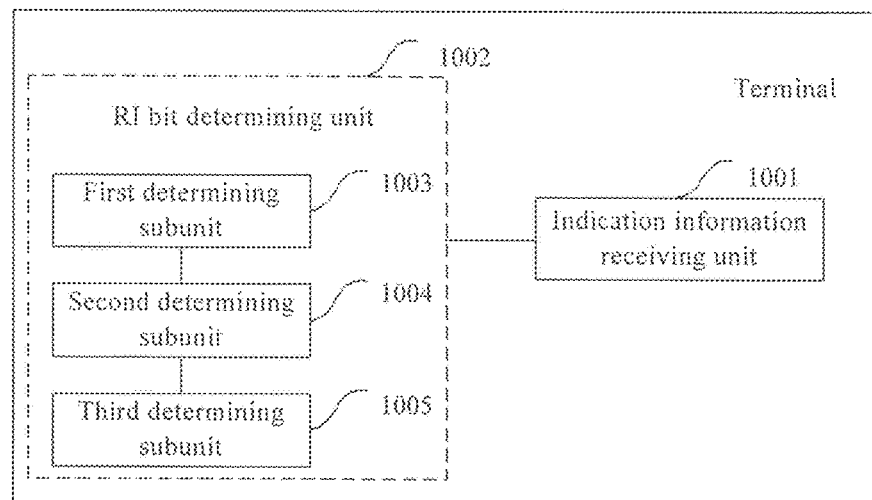
FIG. 11 is a schematic structural diagram of another embodiment of a terminal according to the present invention.

FIG. 11 is a schematic structural diagram of another embodiment of a terminal according to the present invention. As shown in FIG. 11, based on the structure shown in FIG. 10, the RI bit determining unit 1002 may selectively include the following units: a first determining subunit 1003, a second determining subunit 1004, and a third determining subunit 1005.

The first determining subunit 1003 is configured to: when the indication information receiving unit receives first CQI report configuration information sent by the base station, determine the bit number based on the MIMO capability indicated by the band combination.

The second determining subunit 1004 is configured to: when the indication information receiving unit receives second CQI report configuration information sent by the base station, determine the bit number based on the MIMO capability indicated by the terminal category.

The third determining subunit 1005 is configured to: if the CQI report configuration information sent by the base station and received by the indication information receiving unit carries first information, where the first information is used to instruct the terminal so determine the bit number based on the MIMO capability indicated by the band combination of the terminal, determine the bit number based on the MIMO capability indicated by the band combination of the terminal; or if the received CQI report configuration information sent by the base station does not carry the first information, determine the bit number based on the MIMO capability indicated by the terminal category; or if the received CQI report configuration information sent by the base station carries second information, where the second information is used to instruct the terminal to determine the bit number according to the MIMO capability indicated by the terminal category, determine the bit number based on the MIMO capability indicated by the terminal category.

The terminal in this embodiment receives the indication information sent by the base station, for determining the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

Embodiment 10

Figure 12:
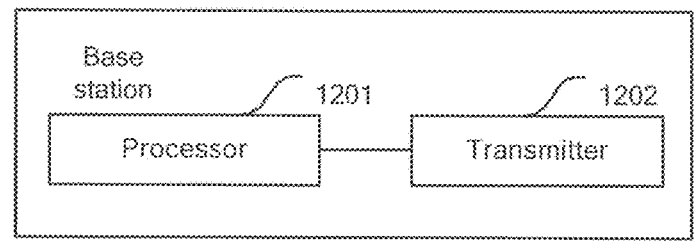
FIG. 12 is a schematic physical structural diagram of an embodiment of a base station according to the present invention.

FIG. 12 is a schematic physical structural diagram of an embodiment of a base station according to the present invention, where the base station may perform a method according to any embodiment of the present invention. As shown in FIG. 12, the base station in this embodiment may include a processor 1201 and a transmitter 1202.

The processor 1201 is configured to determine indication information according to a correspondence between a terminal and the base station and a multi-input multi-output MIMO capability of the terminal, where the indication information includes information used by the terminal for determining a bit number occupied for sending a rank indication RI.

The transmitter 1202 is configured to send the indication information to the terminal, so that the terminal determines, according to the indication information, the bit number occupied for sending the RI.

Further, the processor 1201 is specifically configured to: when the terminal matches the base station, determine the indication information based on a multi-input multi-output MIMO capability indicated by a terminal category of the terminal or a MIMO capability indicated by a band combination of the terminal; or when the terminal does not match the base station, determine the indication information based on a MIMO capability indicated by a terminal category of the terminal.

Further, the indication information includes channel quality indicator CQI report configuration information. The processor 1201 is specifically configured to; when the indication information is determined based on the MIMO capability indicated by the band combination of the terminal, determine first CQI report configuration information as the indication information; and when the indication information is determined based on the MIMO capability indicated by the terminal category of the terminal, determine second CQI report configuration information as the indication information.

Further, the indication information includes CQI report configuration information. The processor 1201 is specifically configured to: when the indication information is determined based on the MIMO capability indicated by the band combination of the terminal, determine to carry first information in the CQI report configuration information, where the first information is used to instruct the terminal to determine the bit number based on the MIMO capability indicated by the band combination of the terminal; or when the indication information is determined based on the MIMO capability indicated by the terminal category of the terminal, determine not to carry the first information in the CQI report configuration information, so as to instruct the terminal to determine the bit number based on the MIMO capability indicated by the terminal category of the terminal; or when the indication information is determined based on the MIMO capability indicated by the terminal category of the terminal, carry second information in the CQI report configuration information, where the second information is used to instruct the terminal to determine the bit number according to the MIMO capability indicated by the terminal category.

Further, the indication information includes carrier aggregation CA indication information. The processor 1201 is specifically configured to determine the CA indication information as the indication information, where the CA indication information is used to instruct the terminal to determine the bit number according to the MIMO capability indicated by the band combination of the terminal.

Further, the processor 1201 is further configured to: before the indication information is sent to the terminal, determine the bit number based on the MIMO capability indicated by the terminal category of the terminal; or after the indication information is sent to the terminal, determine the bit number based on the correspondence between the terminal and the base station.

Further, the processor 1201 is specifically configured to determine the bit number that is occupied by the RI sent by the terminal, as the indication information.

Further, the processor 1201 is further configured to: when the bit number is determined based on the MIMO capability indicated by the band combination of the terminal, if a band combination currently used by the terminal includes a band that appears at least two times, determine, based on a maximum value of the maximum number of supported MIMO layers that is indicated by the band, the bit number corresponding to the band.

The base station in this embodiment sends the indication information to the terminal, for determining the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between the base station and the UE based on a correct RI.

Embodiment 11

Figure 13:
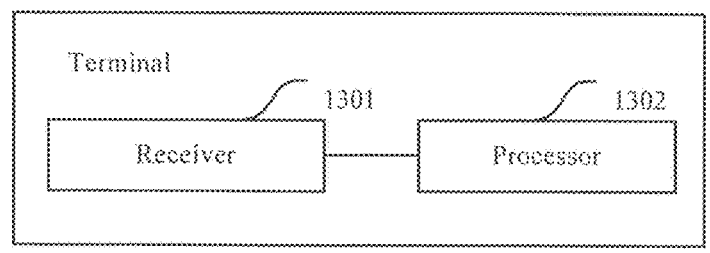
FIG. 13 is a schematic physical structural diagram of an embodiment of a terminal according to the present invention.

FIG. 13 is a schematic physical structural diagram of an embodiment of a terminal according to the present invention, where the terminal may perform a method according to any embodiment of the present invention. As shown in FIG. 13, the terminal in this embodiment may include a receiver 1301 and a processor 1302.

The receiver 1301 is configured to receive indication information sent by a base station, where the indication information includes information used by the terminal for determining a bit number occupied for sending a rank indication RI.

The processor 1302 is configured to determine, according to the indication information, the bit number occupied by the RI.

Further, the processor 1302 is specifically configured to select, according to the indication information received by the receiver, to determine the bit number based on a multi-input, multi-output MIMO capability indicated by a terminal category or a MIMO capability indicated by a band combination.

Further, the indication information includes CQI report configuration information. The processor 1302 is specifically configured to: when the receiver receives first CQI report configuration information sent by the base station, determine the bit number based on the MIMO capability indicated by the band combination; and when the receiver receives second CQI report configuration information sent by the base station, determine the bit number based on the MIMO capability indicated by the terminal category.

Further, the indication information includes CQI report configuration information. The processor 1302 is specifically configured to: when the CQI report configuration information sent by the base station and received the receiver carries first information, where the first information is used to instruct the terminal to determine the bit number based on the MIMO capability indicated by the band combination of the terminal, determine the bit number based on the MIMO capability indicated by the band combination of the terminal; or when the CQI report configuration information sent by the base station and received by the receiver does not carry the first information, determine the bit number based on the MIMO capability indicated by the terminal category; or when the received CQI report configuration information sent by the base station carries second information, where the second information is used to instruct the terminal to determine the bit number according to the MIMO capability indicated by the terminal category, determine the bit number based on the MIMO capability indicated by the terminal category.

Further, the processor 1302 is specifically configured to: when the receiver receives the CA indication information sent by the base station, determine the bit number based on the MIMO capability indicated by the band combination.

Further, the processor 1302 is further configured to: when the bit number is determined based on the MIMO capability indicated by the band combination of the terminal, if a currently used band combination includes a band that appears at least two times, determine, based on a maximum value of the maximum number of supported MIMO layers that is indicated by the band, the bit number corresponding to the band.

Further, the processor 1302 is further configured to: before the receiver receives the indication information sent by the base station, determine the bit number based on the MIMO capability indicated by the terminal category.

Further, the receiver 1301 is specifically configured to receive the bit number occupied by the RI and sent by the base station. The processor 1302 is specifically configured to use the bit number received by the receiver as the bit number occupied by the RI.

The terminal in this embodiment receives the indication information sent by the base station, for determining the bit number occupied by the RI, so that the base station side and the terminal side agree on a basis for determining the bit number occupied by the RI. Therefore, when the UE reports the RI, the UE and the base station agree on understanding of the bit number occupied by RI information, thereby ensuring that a MIMO function can be normally used between. the base station and the UE based on a correct RI.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    obtaining, by an apparatus, configuration information from a base station; and
    selecting, by the apparatus, a current maximum number of multi-input multi-output (MIMO) layers according to band combination and the obtained configuration information, wherein the current maximum number of the MIMO layers is a maximum value of the supported MIMO layers for one frequency band that appears at least two times in the band combination;

wherein the band combination is a combination of frequency bands which indicates MIMO capabilities of the apparatus, and each of the MIMO capabilities represents a maximum number of supported MIMO layers of the apparatus in each of the frequency bands of the band combination.

2. The method according to claim 1, further comprising: determining, by the apparatus, a bit number based on the current maximum number of the MIMO layers.

3. The method according to claim 2, further comprising: determining, by the apparatus, the current maximum number of the MIMO layers according to the configuration information and UE category of the apparatus when the UE capability of the apparatus does not comprise the MIMO capabilities.

4. An apparatus, comprising:
a receiver configured to obtain configuration information from a base station; and
a processor configured to select a current maximum number of multi-input multi-output (MIMO) layers according to band combination and the obtained configuration information, wherein the current maximum number of the MIMO layers is a maximum value of the supported MIMO layers for one frequency band that appears at least two times in the band combination;
wherein the band combination is a combination of frequency bands which indicates MIMO capabilities of the apparatus, and each of the MIMO capabilities represents a maximum number of supported MIMO layers of the apparatus in each of the frequency bands of the band combination.

5. The apparatus according to claim 4, wherein the processor is further configured to determine a bit number based on the current maximum number of the MIMO layers.

6. The apparatus according to claim 5, wherein the processor is further configured to determine the current maximum number of the MIMO layers according to the configuration information and UE category of the apparatus when the UE capability of the apparatus does not comprise the MIMO capabilities.

7. An apparatus comprising:
at least one processor;
a non-transitory computer readable storage medium coupled to the at least one processor and storing instructions that, when executed by the at least one processor, cause the apparatus to:
obtain configuration information from a base station, and
select a current maximum number of multi-input multi-output (MIMO) layers according to a band combination and the obtained configuration information, wherein the current maximum number of the MIMO layers is a maximum value of the supported MIMO layers for one frequency band that appears at least two times in the band combination; and
wherein the band combination is a combination of frequency bands which indicates MIMO capabilities of the apparatus, and each of the MIMO capabilities represents a maximum number of supported MIMO layers of the apparatus in each of the frequency bands of the band combination.

* * * * *